United States Patent [19]

Tokuriki et al.

[11] Patent Number: 5,579,340
[45] Date of Patent: Nov. 26, 1996

[54] WAVEFORM EQUALIZER

[75] Inventors: Motofumi Tokuriki; Katsuya Ishikawa, both of Kawasaki, Japan

[73] Assignee: Fujitsu Limited, Kawasaki, Japan

[21] Appl. No.: 267,496

[22] Filed: Jun. 29, 1994

[30] Foreign Application Priority Data

Jun. 29, 1993 [JP] Japan .................................. 5-158873

[51] Int. Cl.⁶ .............................. H03H 7/30; H03H 7/40; H03K 5/159
[52] U.S. Cl. ........................................ 375/232; 364/724.2
[58] Field of Search .................................. 375/229–236; 364/724.19, 724.2; 333/18, 28 R

[56] References Cited

U.S. PATENT DOCUMENTS 5,414,732  5/1995  Kaufmann ........................ 375/232

Primary Examiner—Stephen Chin
Assistant Examiner—Hai H. Phan
Attorney, Agent, or Firm—Staas & Halsey

[57] ABSTRACT

A waveform equalizer includes: a data signal input terminal for receiving an input data signal which is the object of waveform equalization; a plurality of S/H circuits each connected to the data signal input terminal; a sampling control circuit for repeatedly bringing the plurality of S/H circuits, one by one, to a sampling operation state; a selection circuit for selecting outputs of a predetermined number of S/H circuits which are in a hold operation state, respectively, from among the plurality of S/H circuits; a weighting circuit for weighting the outputs of the predetermined number of S/H circuits selected by the selection circuit; and an addition circuit for effecting an addition of outputs of the weighting circuit, thereby obtaining a waveform-equalized data signal from an output end of the addition circuit. By the constitution, it is possible to carry out a waveform equalization with high precision, and to realize a high speed of operation and a reduction in the scale of circuit.

11 Claims, 14 Drawing Sheets

Fig. 2(A) DIN PRIOR ART
Fig. 2(B) SP PRIOR ART
Fig. 2(C) OUTPUT OF S/H 3 PRIOR ART
Fig. 2(D) OUTPUT OF S/H 4 PRIOR ART
Fig. 2(E) OUTPUT OF S/H 5 PRIOR ART
Fig. 2(F) OUTPUT OF S/H 6 PRIOR ART
Fig. 2(G) OUTPUT OF S/H 7 PRIOR ART
Fig. 2(H) OUTPUT OF S/H 8 PRIOR ART
Fig. 2(I) DOUT PRIOR ART

Fig. 4(A) DIN
Fig. 4(B) SP
Fig. 4(C) OUTPUT OF S/H 17
Fig. 4(D) OUTPUT OF S/H 18
Fig. 4(E) OUTPUT OF S/H 19
Fig. 4(F) OUTPUT OF S/H 20
Fig. 4(G) OUTPUT OF S/H 21
Fig. 4(H) OUTPUT OF S/H 22
Fig. 4(I) S1
Fig. 4(J) S2
Fig. 4(K) DOUT

○ ··· SELECT
× ··· NON-SELECT

Fig.11

| | | CLK | ⏜ | ⏜ | ⏜ | ⏜ | ⏜ | ⏜ | ⏜ | ⏜ | ⏜ | ⏜ | - - - |
|---|---|---|---|---|---|---|---|---|---|---|---|---|---|
| SELECTOR 62 | CONTACT 62B | | × | × | × | × | ○ | × | × | × | × | ○ | - - - |
| | CONTACT 62C | | × | × | × | ○ | × | × | × | × | ○ | × | - - - |
| | CONTACT 62D | | × | × | ○ | × | × | × | × | ○ | × | × | - - - |
| | CONTACT 62E | | × | ○ | × | × | × | × | ○ | × | × | × | - - - |
| | CONTACT 62F | | ○ | × | × | × | × | ○ | × | × | × | × | - - - |
| SELECTOR 63 | CONTACT 63B | | × | × | × | ○ | × | × | × | × | ○ | × | - - - |
| | CONTACT 63C | | × | × | ○ | × | × | × | × | ○ | × | × | - - - |
| | CONTACT 63D | | × | ○ | × | × | × | × | ○ | × | × | × | - - - |
| | CONTACT 63E | | ○ | × | × | × | × | ○ | × | × | × | × | - - - |
| | CONTACT 63F | | × | × | × | × | ○ | × | × | × | × | ○ | - - - |
| SELECTOR 64 | CONTACT 64B | | × | × | ○ | × | × | × | × | ○ | × | × | - - - |
| | CONTACT 64C | | × | ○ | × | × | × | × | ○ | × | × | × | - - - |
| | CONTACT 64D | | ○ | × | × | × | × | ○ | × | × | × | × | - - - |
| | CONTACT 64E | | × | × | × | × | ○ | × | × | × | × | ○ | - - - |
| | CONTACT 64F | | × | × | × | ○ | × | × | × | × | ○ | × | - - - |
| SELECTOR 65 | CONTACT 65B | | × | ○ | × | × | × | × | ○ | × | × | × | - - - |
| | CONTACT 65C | | ○ | × | × | × | × | ○ | × | × | × | × | - - - |
| | CONTACT 65D | | × | × | × | × | ○ | × | × | × | × | ○ | - - - |
| | CONTACT 65E | | × | × | × | ○ | × | × | × | × | ○ | × | - - - |
| | CONTACT 65F | | × | × | ○ | × | × | × | × | ○ | × | × | - - - |

○ ··· SELECT
× ··· NON-SELECT

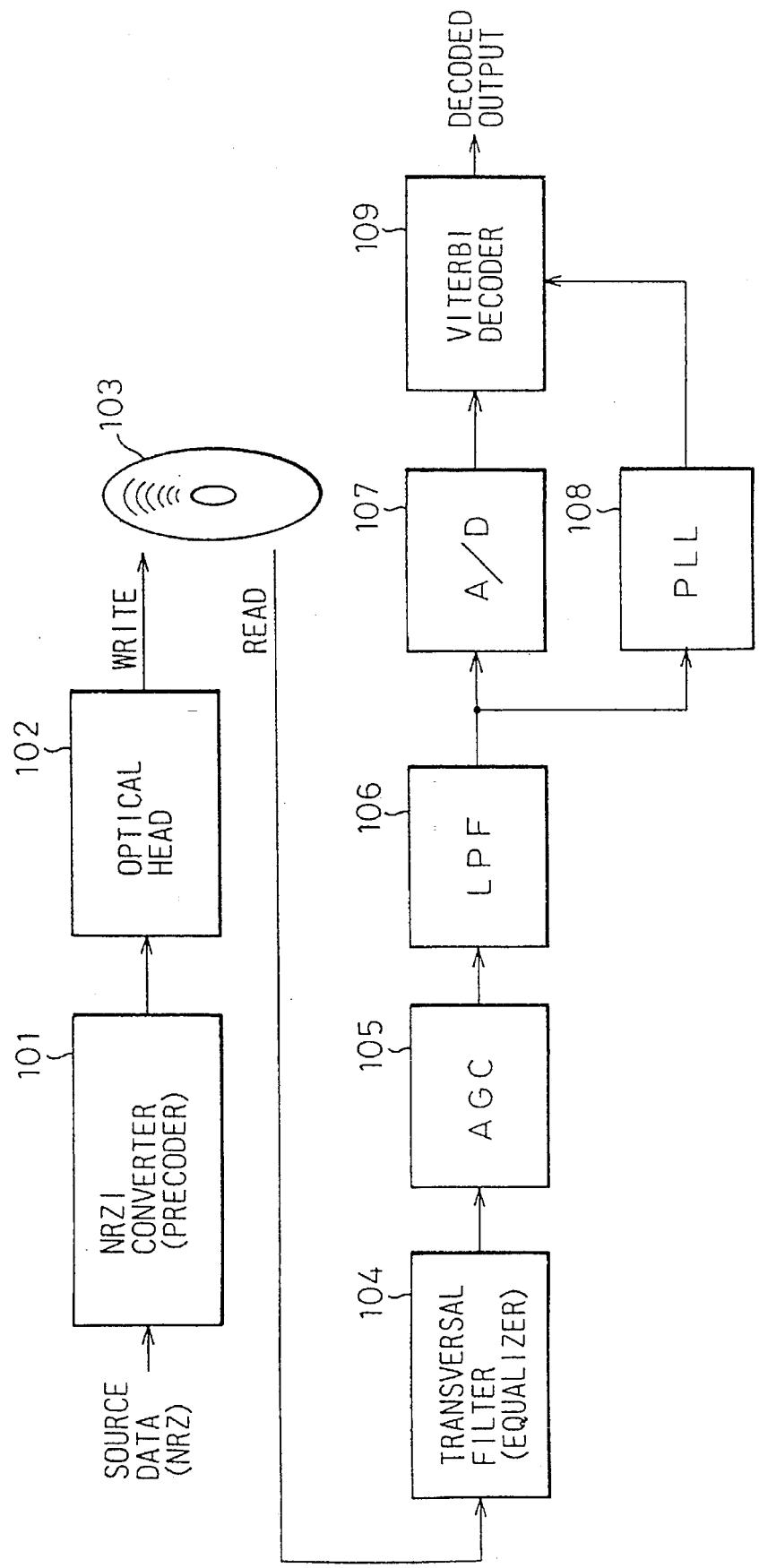

WAVEFORM EQUALIZER

BACKGROUND OF THE INVENTION

1. Field of the Invention

The present invention relates to a waveform equalizer which equalizes the waveform of a data signal containing waveform distortions.

2. Description of the Related Art

For example, in a hard disk drive, a data signal read from a read head contains waveform distortions, more or less. Accordingly, without giving any processing to the data signal containing waveform distortions, it would be impossible to exactly read data recorded in a hard disk. In a typical hard disk drive, a data signal read from a read head is first amplified by an amplification circuit, and then the waveform thereof is equalized by a waveform equalizer. Then the waveform-equalized signal is fed to a peak value detection circuit, and thus the reading of recorded data is carried out.

Conventionally, a typical waveform equalizer includes a plurality of sample and hold circuits (each referred to as a S/H circuit) connected in a cascade connection, a circuit for weighting outputs of a predetermined number of S/H circuits among the plurality of S/H circuits, and a circuit for effecting an addition of outputs of the weighting circuit to thereby output a waveform-equalized signal. In this constitution, each of the S/H circuits responds to a sampling signal to thereby alternatively repeat a sampling operation and a hold operation. Also, the S/H circuit provided at the first stage receives an input data signal which is the object of waveform equalization.

According to the constitution, however, a problem occurs in that respective sampling errors and hold errors are accumulated, and thus it is impossible to obtain a waveform-equalized output signal with high precision. This is because the input data signal is shifted with being sampled and held in sequence through the plurality of S/H circuits.

Also, since the outputs of the predetermined number of S/H circuits, which alternatively repeat the sampling operation and the hold operation, are fed to the weighting circuit, another problem occurs in that the operation speed is relatively lowered.

Note, the problems in the prior art will be explained later in detail in contrast with the preferred embodiments of the present invention.

SUMMARY OF THE INVENTION

An object of the present invention is to provide a waveform equalizer by which it is possible to carry out a waveform equalization with high precision, and to realize a high speed of operation and a reduction in the scale of circuit.

To attain the above object, according to the present invention, there is provided a waveform equalizer including: a data signal input terminal for receiving an input data signal which is the object of waveform equalization; a plurality of S/H circuits each connected to the data signal input terminal; a sampling control circuit for repeatedly bringing the plurality of S/H circuits, one by one, to a sampling operation state; a selection circuit for selecting outputs of a predetermined number of S/H circuits which are in a hold operation state, respectively, from among the plurality of S/H circuits; a weighting circuit for weighting the outputs of the predetermined number of S/H circuits selected by the selection circuit; and an addition circuit for effecting an addition of outputs of the weighting circuit, thereby obtaining a waveform-equalized data signal from an output end of the addition circuit.

BRIEF DESCRIPTION OF THE DRAWINGS

Other objects and features of the present invention will be described hereinafter in detail by way of preferred embodiments with reference to the accompanying drawings, in which:

FIG. 11 is a timing chart showing the operations of each selector shown in FIG. 10;

FIG. 14 is a block diagram illustrating another application of the waveform equalizer according to each embodiment of the present invention.

DESCRIPTION OF THE PREFERRED EMBODIMENTS

For a better understanding of the preferred embodiments of the present invention, the related prior art will be explained with reference to FIGS. 1 to 4(K).

Figure 1:
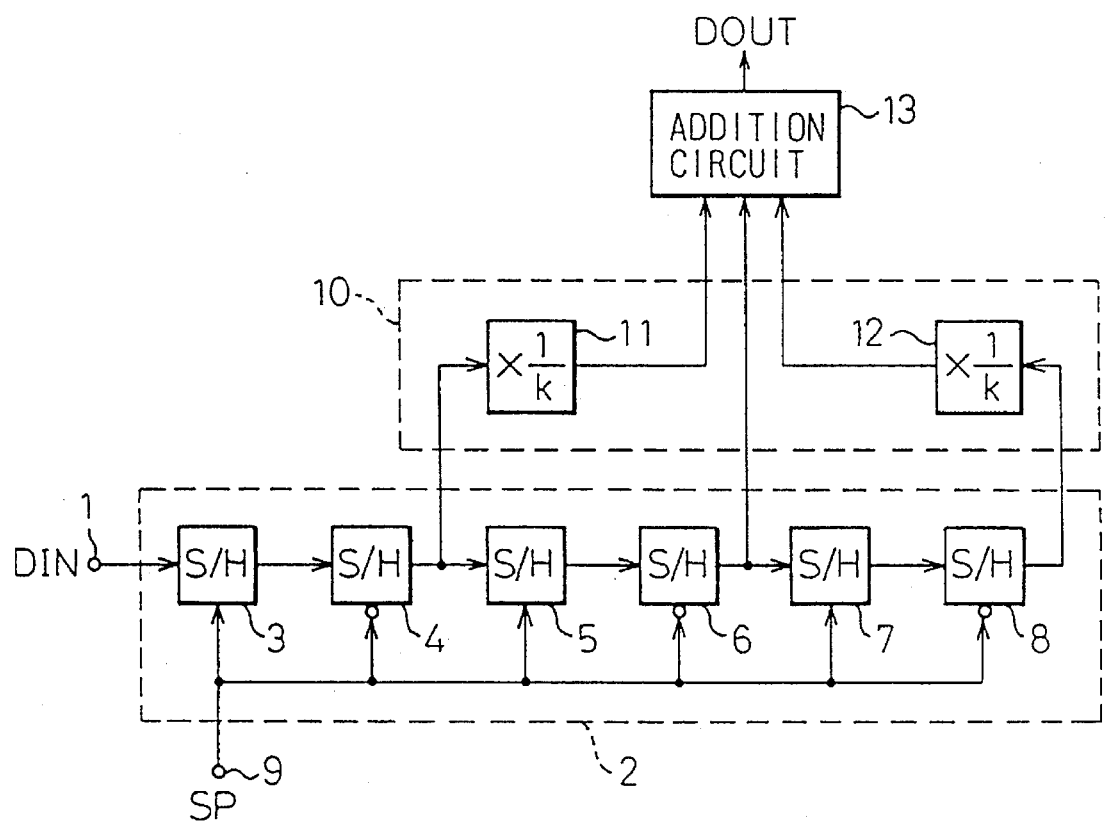
FIG. 1 is a diagram illustrating the circuit constitution of a prior art waveform equalizer.
Figure 2:
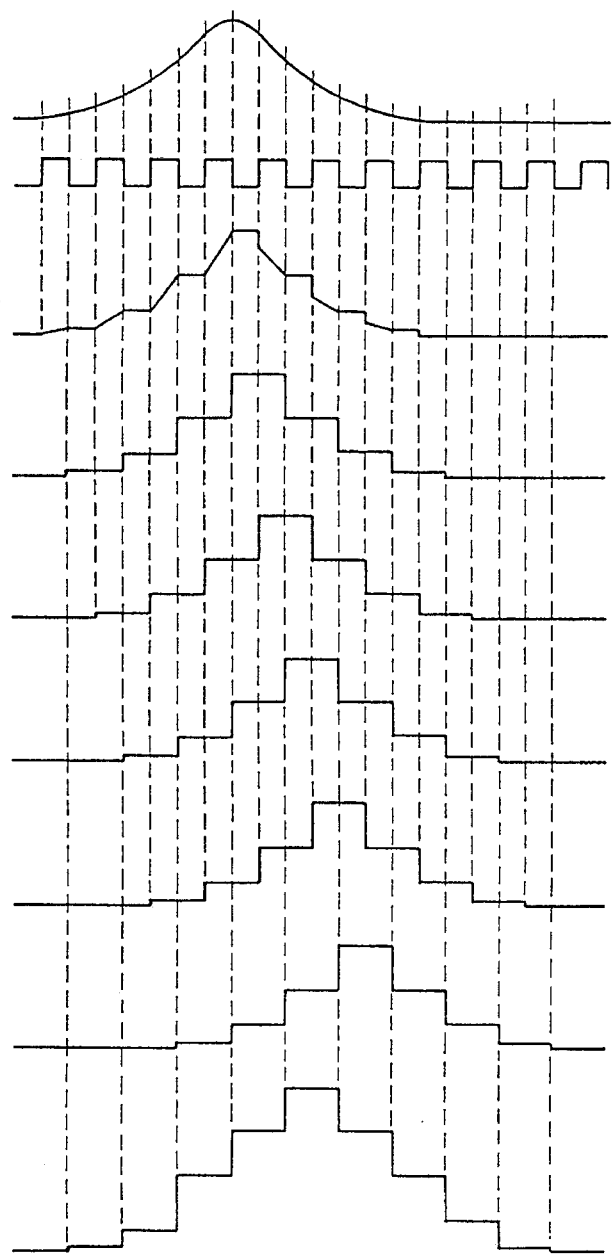
FIGS. 2(A)–2(I) are waveform diagram showing the operation of the waveform equalizer shown in FIG. 1.

FIG. 1 illustrates the circuit constitution of a prior art waveform equalizer, which is provided, for example, in a read circuit of a hard disk drive.

In the illustration, reference 1 denotes a data signal input terminal for receiving a data signal DIN which is read from a hard disk and is the object of waveform equalization; reference 2 a delay circuit; references 3 to 8 each a S/H circuit; and reference 9 a sampling signal input terminal for receiving a sampling signal SP.

The S/H circuits 3, 5 and 7 are constituted such that they carry out a sampling operation when the sampling signal SP is at "H" level (i.e., higher potential), and such that they carry out a hold operation when the sampling signal SP is at "L" level (i.e., lower potential). On the other hand, the S/H circuits 4, 6 and 8 are constituted such that they carry out a sampling operation when the sampling signal SP is at "L" level, and such that they carry out a hold operation when the sampling signal SP is at "H" level. Namely, the S/H circuits 3, 5 and 7, and the S/H circuits 4, 6 and 8, carry out a sampling operation alternately with each other.

Also, reference 10 denotes a weighting circuit; reference 11 a multiplication circuit for making an output of the S/H circuit 4 one k-th (1/k); and reference 12 a multiplication circuit for making an output of the S/H circuit 8 one k-th (1/k). Furthermore, reference 13 denotes an addition circuit which effects an addition of an output of the multiplication circuit 11, an output of the S/H circuit 6, and an output of the multiplication circuit 12. Also, reference DOUT denotes an output data signal.

In the illustrated waveform equalizer, the input data signal DIN received at the data signal input terminal 1 is shifted with being sampled and held in sequence through the S/H circuits 3 to 8. The outputs of the S/H circuits 4 and 8 are made one k-th by the multiplication circuits 11 and 12, respectively, and then fed to the addition circuit 13. Also, the output of the S/H circuit 6 is directly fed to the addition circuit 13. The addition circuit 13 in turn effects an addition of the output of the multiplication circuit 11, the output of the S/H circuit 6, and the output of the multiplication circuit 12, and thus outputs a waveform-equalized output data signal DOUT.

FIGS. 2(A)–2(I) show the waveforms of each portion, representing the operation of the waveform equalizer shown in FIG. 1.

FIG. 2(A) denotes the input data signal DIN; FIG. 2(B) denotes the sampling signal SP; FIG. 2(C) denotes the output of the S/H circuit 3; FIG. 2(D) denotes the output of the S/H circuit 4; FIG. 2(E) denotes the output of the S/H circuit 5; FIG. 2(F) denotes the output of the S/H circuit 6; FIG. 2(G) denotes the output of the S/H circuit 7; FIG. 2(H) denotes the output of the S/H circuit 8; and FIG. 2(I) denotes the output data signal DOUT where k is equal to 2 in the multiplication circuits 11 and 12.

According to the prior art waveform equalizer shown in FIG. 1, the input data signal DIN input to the data signal input terminal 1 is shifted with being sampled and held in sequence through the S/H circuits 3 to 8. Accordingly, a problem occurs in that respective sampling errors and hold errors are accumulated, and thus it is impossible to obtain the output data signal DOUT with high precision of equalization. Also, the waveform equalizer of FIG. 1 poses a problem in that the operation speed is relatively lowered, since the outputs of the S/H circuits 4, 6 and 8, which repeatedly carry out the sampling operation and the hold operation, are fed to the weighting circuit 10.

Figure 3:
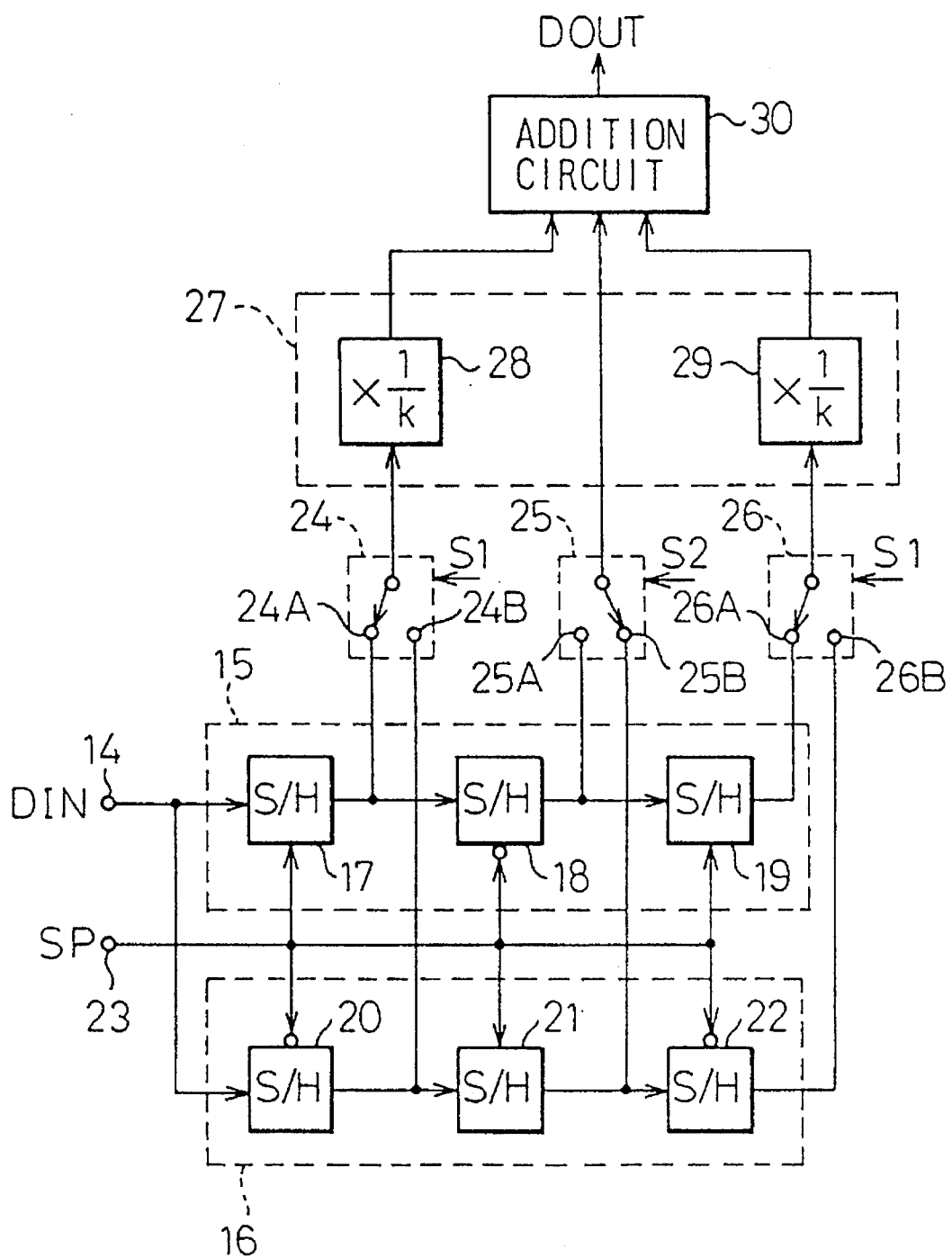
FIG. 3 is a diagram illustrating the circuit constitution of another prior art waveform equalizer.
Figure 4:
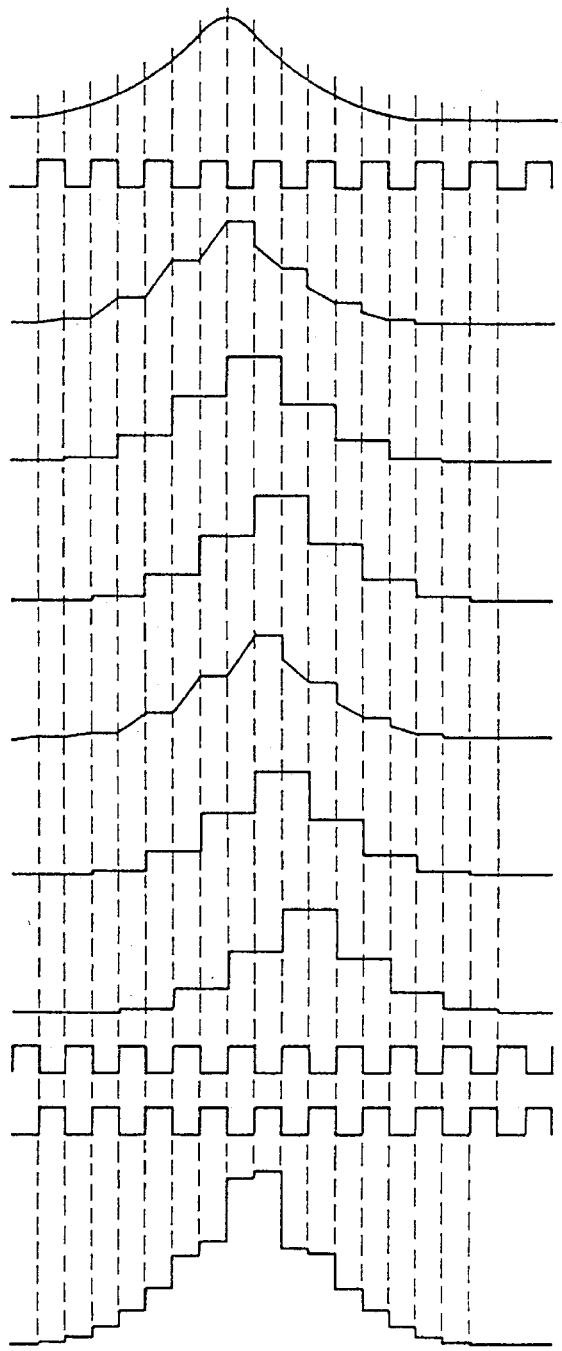
FIGS. 4(A)–4(K) are waveform diagram showing the operation of the waveform equalizer shown in FIG. 3.

FIG. 3 illustrates the circuit constitution of another prior art waveform equalizer.

In the illustration, reference 14 denotes a data signal input terminal for receiving a data signal DIN which is read from a hard disk and is the object of waveform equalization; references 15 and 16 each a delay circuit; references 17 to 22 each an S/H circuit; and reference 23 a sampling signal input terminal for receiving a sampling signal SP.

The S/H circuits 17, 19 and 21 are constituted such that they carry out a sampling operation when the sampling signal SP is at "H" level, and such that they carry out a hold operation when the sampling signal SP is at "L" level. On the other hand, the S/H circuits 18, 20 and 22 are constituted such that they carry out a sampling operation when the sampling signal SP is at "L" level, and such that they carry out a hold operation when the sampling signal SP is at "H" level.

Also, reference 24 denotes a selector which selects a contact 24A or a contact 24B in response to a selection control signal S1 with inverse-phase relation to the sampling signal SP. In this example, where the selection control signal S1 is at "H" level, the contact 24A is selected, and where the selection control signal S1 is at "L" level, the contact 24B is selected.

Also, reference 25 denotes a selector which selects a contact 25A or a contact 25B in response to a selection control signal S2 with in-phase relation to the sampling signal SP. In this example, where the selection control signal S2 is at "L" level, the contact 25A is selected, and where the selection control signal S2 is at "H" level, the contact 25B is selected.

Also, reference 26 denotes a selector which selects a contact 26A or a contact 26B in response to the selection control signal S1. Where the selection control signal S1 is at "H" level, the contact 26A is selected, and where the selection control signal S1 is at "L" level, the contact 26B is selected.

Also, reference 27 denotes a weighting circuit; reference 28 a multiplication circuit for making an output of the selector 24 one k-th (1/k); and reference 29 a multiplication circuit for making an output of the selector 26 one k-th (1/k). Furthermore, reference 30 denotes an addition circuit which effects an addition of an output of the multiplication circuit 28, an output of the selector 25, and an output of the multiplication circuit 29.

In the illustrated waveform equalizer, the input data signal DIN received at the data signal input terminal 14 is shifted with being sampled and held in sequence through the S/H circuits 17 to 19, and with a delay of half a period of the sampling signal SP, is shifted with being sampled and held in sequence through the S/H circuits 20 to 22.

When the sampling signal SP is at "L" level, the S/H circuits 17, 19 and 21 are in a hold operation state, and the S/H circuits 18, 20 and 22 are in a sampling operation state. In this case, the selection control signal S1 is at "H" level, and the selection control signal S2 is at "L" level. Accordingly, the selector 24 selects the contact 24A; the selector 25 selects the contact 25B; and the selector 26 selects the contact 26A.

As a result, the outputs of the S/H circuits 17 and 19 are made one k-th by the multiplication circuits 28 and 29, respectively, and then fed to the addition circuit 30. Also, the output of the S/H circuit 21 is directly fed to the addition circuit 30. The addition circuit 30 in turn effects an addition of the output of the multiplication circuit 28, the output of the S/H circuit 21, and the output of the multiplication circuit 29.

Contrary to this, when the sampling signal SP is at "H" level, the S/H circuits 17, 19 and 21 are in a sampling operation state, and the S/H circuits 18, 20 and 22 are in a hold operation state. In this case, the selection control signal S1 is at "L" level, and the selection control signal S2 is at "H" level. Accordingly, the selector 24 selects the contact 24B; the selector 25 selects the contact 25A; and the selector 26 selects the contact 26B.

As a result, the outputs of the S/H circuits 20 and 22 are made one k-th by the multiplication circuits 28 and 29, respectively, and then fed to the addition circuit 30. Also, the output of the S/H circuit 18 is directly fed to the addition circuit 30. The addition circuit 30 in turn effects an addition of the output of the multiplication circuit 28, the output of the S/H circuit 18, and the output of the multiplication circuit 29.

FIGS. 4(A)–4(K) show the waveforms of each portion, representing the operation of the waveform equalizer shown in FIG. 3.

FIG. 4(A) denotes the input data signal DIN; FIG. 4(B) denotes the sampling signal SP; FIG. 4(C) denotes the output of the S/H circuit 17; FIG. 4(D) denotes the output of the S/H circuit 18; FIG. 4(E) denotes the output of the S/H circuit 19; FIG. 4(F) denotes the output of the S/H circuit 20; FIG. 4(G) denotes the output of the S/H circuit 21; FIG. 4(H) denotes the output of the S/H circuit 22; FIG. 4(I) denotes the selection control signal S1; FIG. 4(J) denotes the selection control signal S2; and FIG. 4(K) denotes the output data signal DOUT where k is equal to 2 in the multiplication circuits 28 and 29.

According to the prior art waveform equalizer shown in FIG. 3, two delay circuits 15 and 16 are provided, and the input data signal DIN is shifted through the S/H circuits 17 to 19, or 20 to 22, of the number less than that of the S/H circuits in the waveform equalizer shown in FIG. 1. Accordingly, it is possible to relatively reduce the sampling error and the hold error, and thus to obtain the output data signal DOUT with higher precision of equalization than that of the waveform equalizer of FIG. 1.

Also, the outputs of the S/H circuits 17, 21 and 19, and the outputs of the S/H circuits 20, 18 and 22, are alternately fed to the weighting circuit 27. Furthermore, the supply of a sampled signal voltage to 10 the weighting circuit 27, and the sampling of a signal voltage to be next fed to the weighting circuit 27, are simultaneously carried out. Thus, it is possible to realize a higher speed of operation than that in the waveform equalizer of FIG. 1.

In the waveform equalizer of FIG. 3, however, the outputs of three S/H circuits are the object of addition by the addition circuit 30, while six (=3×2) S/H circuits need to be provided. Accordingly, a problem is posed in that the scale of circuit becomes relatively large. Such a problem also applies to the waveform equalizer of FIG. 1.

Figure 5:
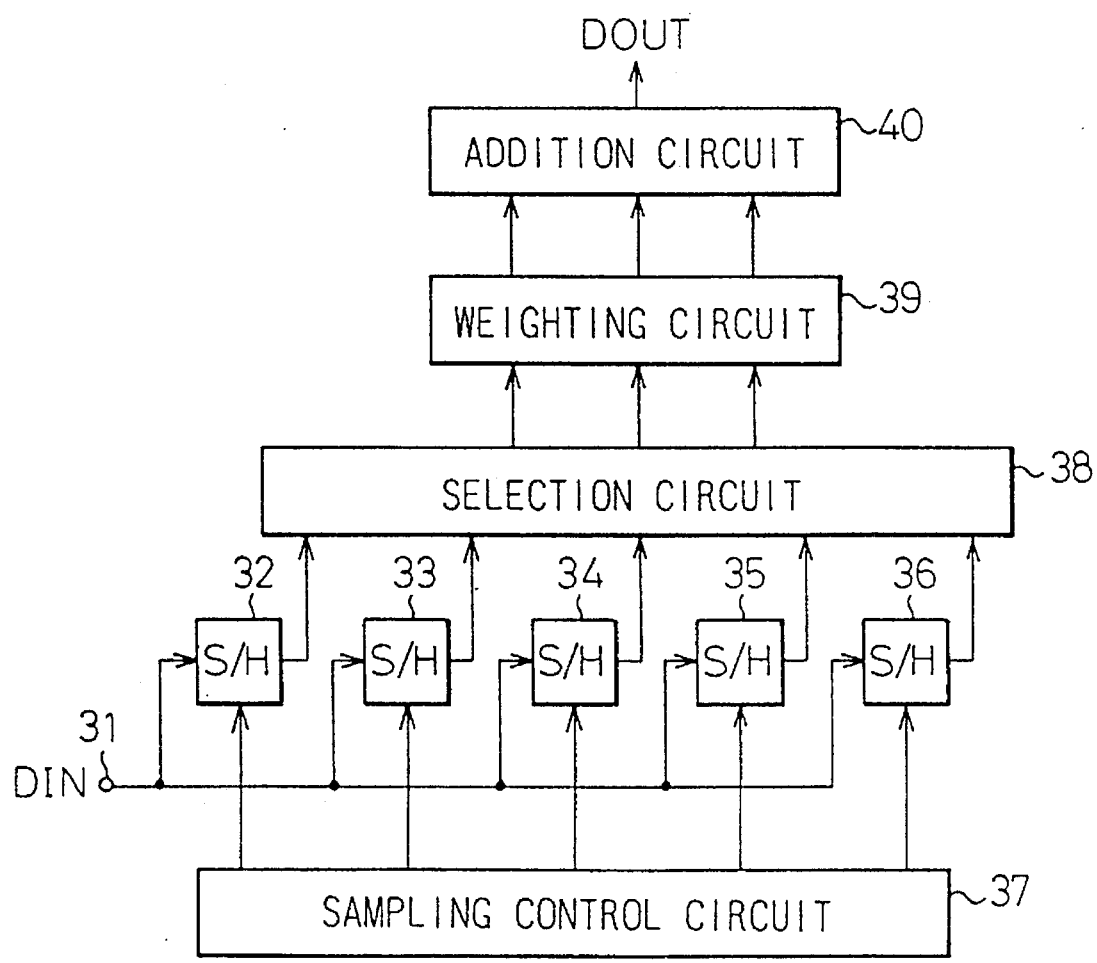
FIG. 5 is a block diagram illustrating the fundamental constitution of the waveform equalizer according to the present invention.

FIG. 5 illustrates the fundamental constitution of the waveform equalizer according to the present invention.

In the illustration, reference 31 denotes a data signal input terminal for receiving an input data signal DIN which is the object of waveform equalization; references 32 to 36 each an S/H circuit; and reference 37 a sampling control circuit for repeatedly bringing the S/H circuits 32 to 36, one by one, to a sampling operation state.

Also, reference 38 denotes a selection circuit for selecting outputs of a predetermined number of S/H circuits which are in a hold operation state, respectively, from among the S/H circuits 32 to 36. Furthermore, reference 39 denotes a weighting circuit for weighting the outputs of the predetermined number of S/H circuits selected by the selection circuit 38; and reference 40 denotes an addition circuit which effects an addition of outputs of the weighting circuit 39. Also, reference DOUT denotes an output data signal obtained from an output end of the addition circuit 40.

According to the above constitution, the plurality of S/H circuits 32 to 36, each directly responsive to the input data signal DIN from the data signal input terminal 31, are controlled to repeatedly carry out a sampling operation, one by one. Also, among S/H circuits in a hold operation state, the outputs of the predetermined number of S/H circuits are selected by the selection circuit 38, and fed via the weighting circuit 39 to the addition circuit 40.

Namely, the input data signal DIN is not shifted through a plurality of S/H circuits, and thus it is possible to effect an addition of each signal weighted with respect to the input data signal DIN which is not subject to accumulation of the sampling and hold errors. As a result, it is possible to obtain the output data signal DOUT with high precision of equalization.

Also, during the period in which the outputs of the predetermined number of S/H circuits selected from among the S/H circuits in a hold operation state are fed via the weighting circuit 39 to the addition circuit 40, one of S/H circuits other than the predetermined number of S/H circuits carries out a sampling operation of the input data signal DIN. Namely, the supply of sampled and held signals to the addition circuit 40 and the sampling of the input data signal DIN are simultaneously carried out, and thus it is possible to realize a high speed of operation.

Furthermore, the selection circuit 38 may be constituted so as to select outputs of S/H circuits in a hold operation state, other than an S/H circuit which has carried out a sampling operation just before, from among the plurality of S/H circuits 32 to 36. In this case, it is possible to supply the addition circuit 40 with the outputs of S/H circuits whose outputs are stable. This contributes to an improvement in the precision of equalization.

Next, preferred embodiments of the present invention will be explained in detail with reference to FIGS. 6 to 12. Note, in the description below, the case where the present invention is applied to a waveform equalizer provided in a read circuit of a hard disk drive will be explained.

FIRST EMBODIMENT (see FIGS. 6 to 9)

Figure 6:
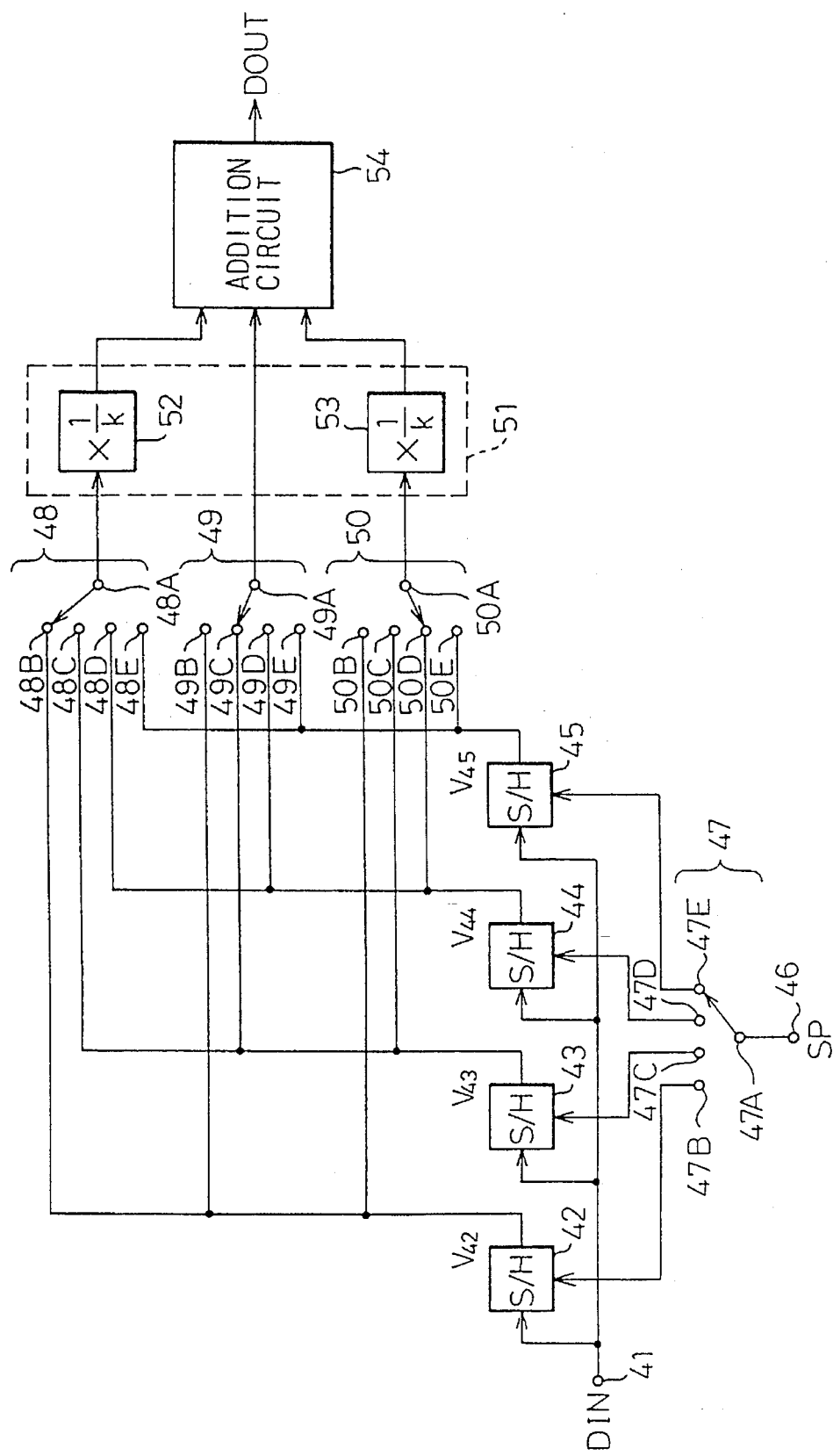
FIG. 6 is a diagram illustrating the circuit constitution of the waveform equalizer according to a first embodiment of the present invention.

FIG. 6 illustrates the circuit constitution of the waveform equalizer according to the first embodiment of the present invention.

In the illustration, reference 41 denotes a data signal input terminal for receiving a data signal DIN which is read from a hard disk and is the object of waveform equalization; references 42 to 45 each an S/H circuit; and reference 46 a sampling signal input terminal for receiving a sampling signal SP. Each of the S/H circuits 42 to 45 is constituted so as to carry out a sampling operation when the sampling signal SP is fed thereto, and so as to carry out a hold operation when the sampling signal SP is not fed thereto.

Also, reference 47 denotes a selector, which has a contact 47A connected to the sampling signal input terminal 46, and contacts 47B to 47E connected to the S/H circuits 42 to 45, respectively, and selects one of the contacts 47B to 47E to thereby feed the sampling signal SP via the selected contact to the corresponding S/H circuit. The selector 47 is constituted in the form of a multiplexer circuit.

In the present embodiment, the selector 47 carries out its select operation under control of control means such as a microcomputer (not shown) based on a predetermined control program. Concretely, the selector 47 is controlled to repeatedly connect the contact 47A to the contacts 47B to 47E, in synchronization with a clock signal CLK (see FIG. 7), according to the sequence of 47E→47D→47C→47B, and thus to repeatedly feed the sampling signal SP to the S/H circuits 42 to 45 according to the sequence of 45→44→43→42. Namely, the S/H circuits 42 to 45 repeatedly carry out a sampling operation in synchronization with the clock signal CLK, according to the sequence of 45→44→43→42.

Also, references 48 to 50 denote selectors, respectively, each having a contact 48A, 49A, 50A connected to a weighting circuit (stated later), and contacts 48B to 48E, 49B to 49E, 50B to 50E connected to the S/H circuits 42 to 45, respectively. Each selector 48 (49, 50) selects one of the contacts 48B to 48E (49B to 49E, 50B to 50E) under control of control means (not shown) in the same manner as in the selector 47. Note, the selectors 48 to 50 are controlled to select outputs of S/H circuits in a hold operation state, from among the S/H circuits 42 to 45. Each of the selectors 48 to 50 is constituted in the form of a multiplexer circuit.

In the present embodiment, the selector 48 is controlled to repeatedly connect the contact 48A to the contacts 48B to 48E, in synchronization with the clock signal CLK, according to the sequence of 48E→48D→48C→48B, and thus to repeatedly select the S/H circuits 42 to 45 according to the sequence of 45→44→43→42. Also, the selector 49 is controlled to repeatedly connect the contact 49A to the contacts 49B to 49E, in synchronization with the clock signal CLK, according to the sequence of 49E→49D→49C→49B, and thus to repeatedly select the S/H circuits 42 to 45 according to the sequence of 45→44→43→42. Also, the selector 50 is controlled to repeatedly connect the contact 50A to the contacts 50B to 50E, in synchronization with the clock signal CLK, according to the sequence of 50E→50D→50C→50B, and thus to repeatedly select the S/H circuits 42 to 45 according to the sequence of 45→44→43→42.

Figure 7:
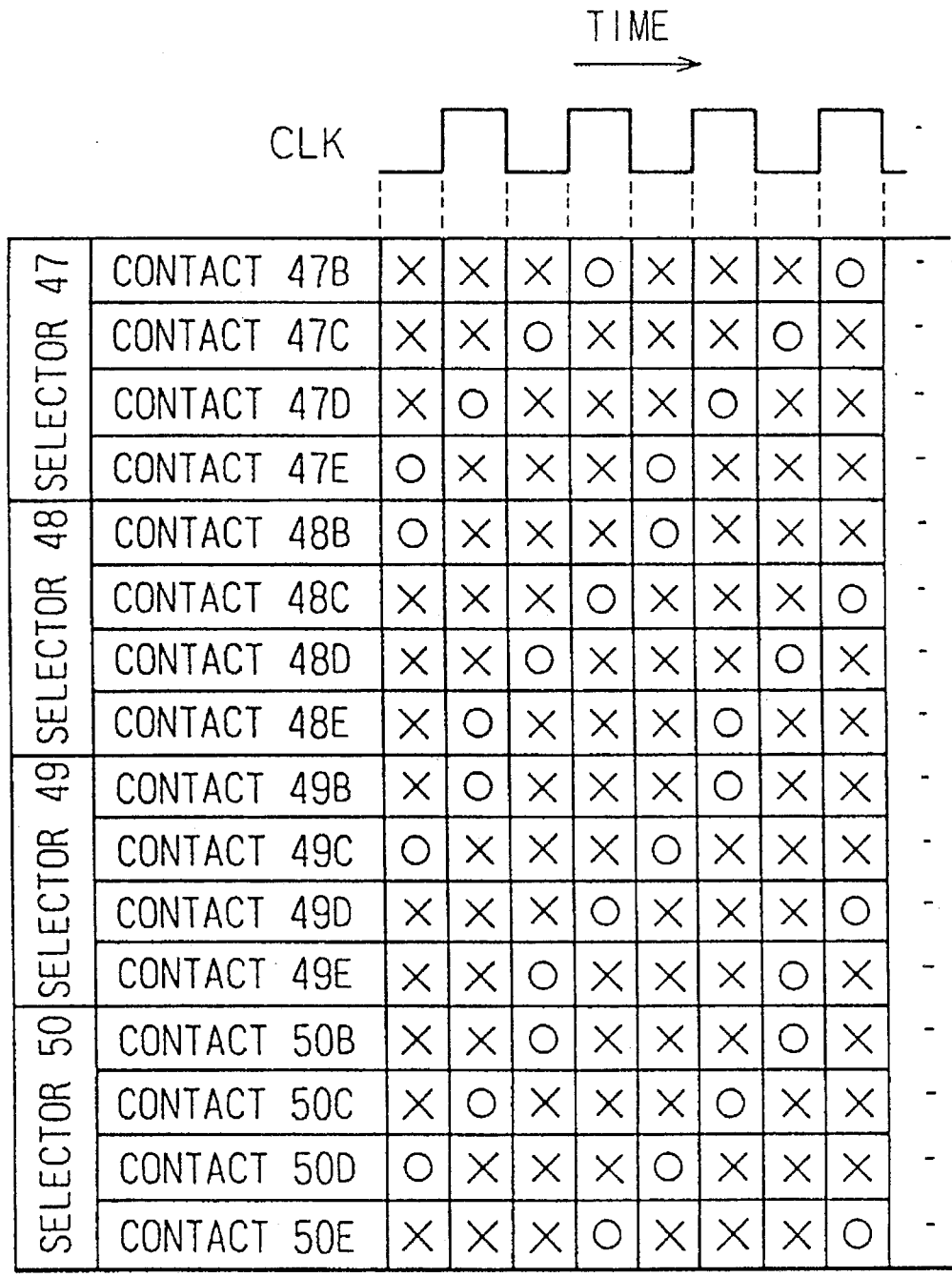
FIG. 7 is a timing chart showing the operations of each selector shown in FIG. 6.

FIG. 7 shows a timing chart defining the operations of each selector 47 to 50. In the chart, the mark "○" indicates the state in which each contact is selected, and the mark "X" indicates the state in which each contact is not selected.

Referring to FIG. 6 again, reference 51 denotes a weighting circuit; reference 52 a multiplication circuit for making an output of the selector 48 one k-th (1/k); and reference 53 a multiplication circuit for making an output of the selector 50 one k-th (1/k). Also, reference 54 denotes an addition circuit which effects an addition of an output of the multiplication circuit 52, an output of the selector 49, and an output of the multiplication circuit 53.

Figure 8:
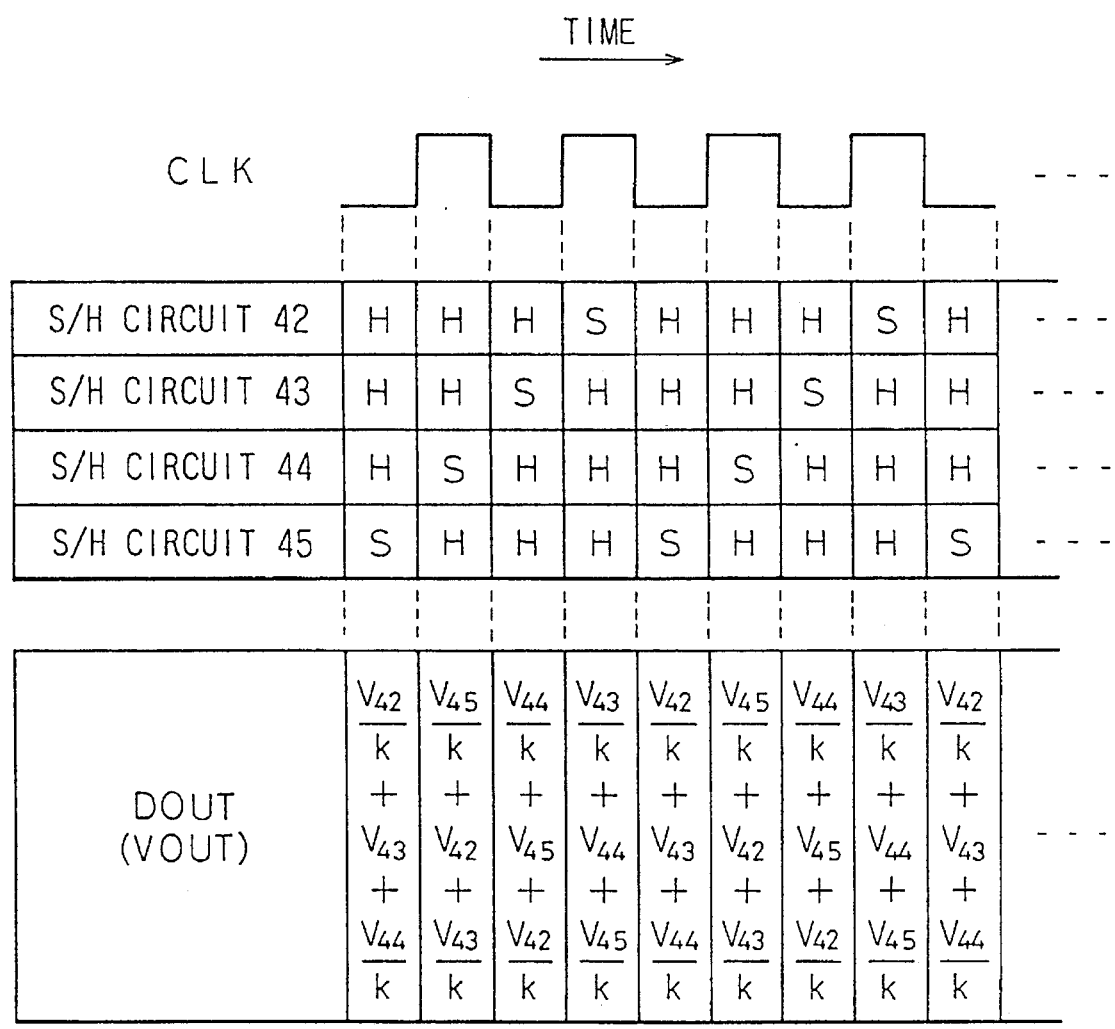
FIG. 8 is a timing chart showing the operation of the waveform equalizer shown in FIG. 6.
Figure 9:
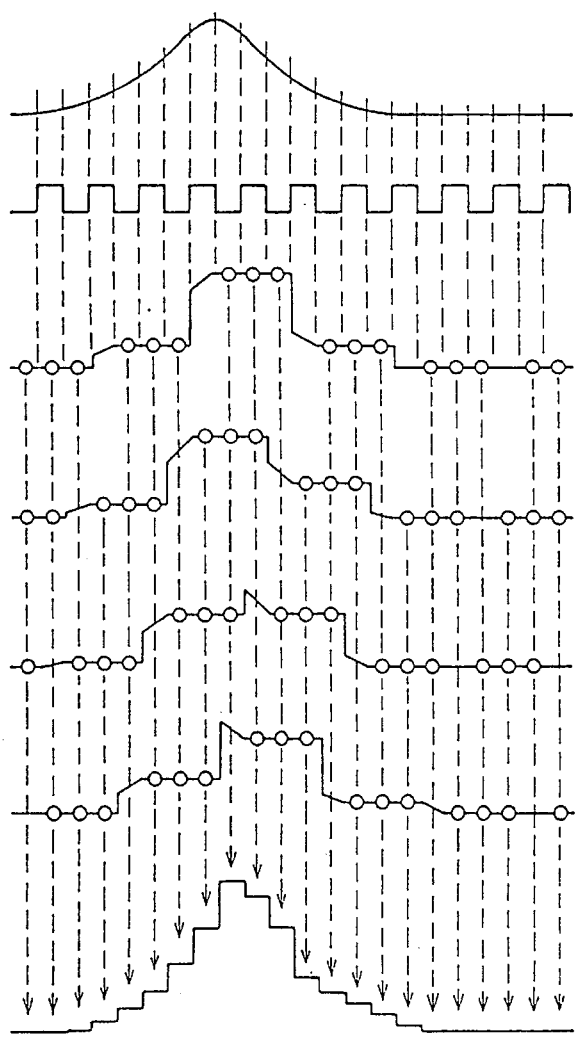
FIGS. 9(A)–9(G) are waveform diagram showing the operation of the waveform equalizer shown in FIG. 6.

FIG. 8 shows a timing chart defining the operation of the waveform equalizer according to the present embodiment. More particularly, it shows the relationship between each state of the S/H circuits 42 to 45 and the output data signal DOUT (voltage value VOUT) with respect to the clock signal CLK, in the case where the selectors 47 to 50 operate as shown in FIG. 7.

In FIG. 8, reference "S" denotes a sampling operation state; reference "H" a hold operation state;

reference $V_{4\,2}$ a hold voltage of the S/H circuit 42;
reference $V_{4\,3}$ a hold voltage of the S/H circuit 43;
reference $V_{4\,4}$ a hold voltage of the S/H circuit 44; and
reference $V_{4\,5}$ a hold voltage of the S/H circuit 45.

FIGS. 9(A)–9(G) show the waveforms of each portion, representing the operation of the waveform equalizer according to the present embodiment (see FIG. 6).

FIG. 9(A) denotes the input data signal DIN; FIG. 9(B) denotes the clock signal CLK; FIG. 9(C) denotes the output of the S/H circuit 42; FIG. 9(D) denotes the output of the S/H circuit 43; FIG. 9(E) denotes the output of the S/H circuit 44; FIG. 9(F) denotes the output of the S/H circuit 45; and FIG. 9(G) denotes the output data signal DOUT.

Namely, according to the present embodiment, the input data signal DIN input to the data signal input terminal 41 is repeatedly sampled by the S/H circuits 42 to 45, in synchronization with the clock signal CLK, according to the sequence of 45→44→43→42.

Referring to FIG. 8, when the S/H circuit 45 is in a sampling operation state (S), the other S/H circuits 42, 43 and 44 are in a hold operation state (H), respectively. In this case, as shown in FIG. 7, the selector 48 selects the output of the S/H circuit 42; the selector 49 selects the output of the S/H circuit 43; and the selector 50 selects the output of the S/H circuit 44. As a result, the voltage value VOUT of the output data signal DOUT is expressed as follows:

$$VOUT = V_{4\,2}/k + V_{4\,3} + V_{4\,4}/k$$

Also, when the S/H circuit 44 is in a sampling operation state, the other S/H circuits 45, 42 and 43 are in a hold operation state, respectively. In this case, the selector 48 selects the output of the S/H circuit 45; the selector 49 selects the output of the S/H circuit 42; and the selector 50 selects the output of the S/H circuit 43. As a result, the voltage value VOUT of the output data signal DOUT is expressed as follows:

$$VOUT = V_{4\,5}/k + V_{4\,2} + V_{4\,3}/k$$

Also, when the S/H circuit 43 is in a sampling operation state, the other S/H circuits 44, 45 and 42 are in a hold operation state, respectively. In this case, the selector 48 selects the output of the S/H circuit 44; the selector 49 selects the output of the S/H circuit 45; and the selector 50 selects the output of the S/H circuit 42. As a result, the voltage value VOUT of the output data signal DOUT is expressed as follows:

$$VOUT = V_{4\,4}/k + V_{4\,5} + V_{4\,2}/k$$

Also, when the S/H circuit 42 is in a sampling operation state, the other S/H circuits 43, 44 and 45 are in a hold operation state, respectively. In this case, the selector 48 selects the output of the S/H circuit 43; the selector 49 selects the output of the S/H circuit 44; and the selector 50 selects the output of the S/H circuit 45. As a result, the voltage value VOUT of the output data signal DOUT is expressed as follows:

$$VOUT = V_{4\,3}/k + V_{4\,4} + V_{4\,5}/k$$

As explained above, according to the first embodiment of the present invention, the input data signal DIN is repeatedly sampled by the S/H circuits 42 to 45 according to the sequence of 45→44→43→42. Also, the outputs of S/H circuits in a hold operation state, respectively, are weighted by the weighting circuit 51, and fed to the addition circuit 54.

Namely, the input data signal DIN is not shifted through a plurality of S/H circuits, and thus it is possible to effect an addition of each signal weighted with respect to the input data signal DIN which is not subject to accumulation of the sampling errors and the hold errors.

Therefore, according to the present embodiment, it is possible to obtain the output data signal DOUT with higher precision of equalization than that in the prior art waveform equalizer as shown in FIG. 1 or 3.

Also, during the period in which the outputs of three S/H circuits in a hold operation state, respectively, are fed via the weighting circuit 51 to the addition circuit 54, the other one S/H circuit carries out a sampling operation of the input data signal DIN. Namely, the supply of sampled and held signals to the addition circuit 54 and the sampling of the input data signal DIN are simultaneously carried out. As a result, it is possible to realize a high speed of operation.

Furthermore, the total number of S/H circuits to be provided (in the present embodiment, "4") is the number of S/H circuits whose outputs are to be fed to the addition circuit (in the present embodiment, "3"), plus one; while the prior art waveform equalizer as shown in FIG. 1 or 3 needs twice the number of S/H circuits whose outputs are to be fed to the addition circuit. Accordingly, it is possible to reduce the scale of circuit of the waveform equalizer, compared with the prior art.

Figure 10:
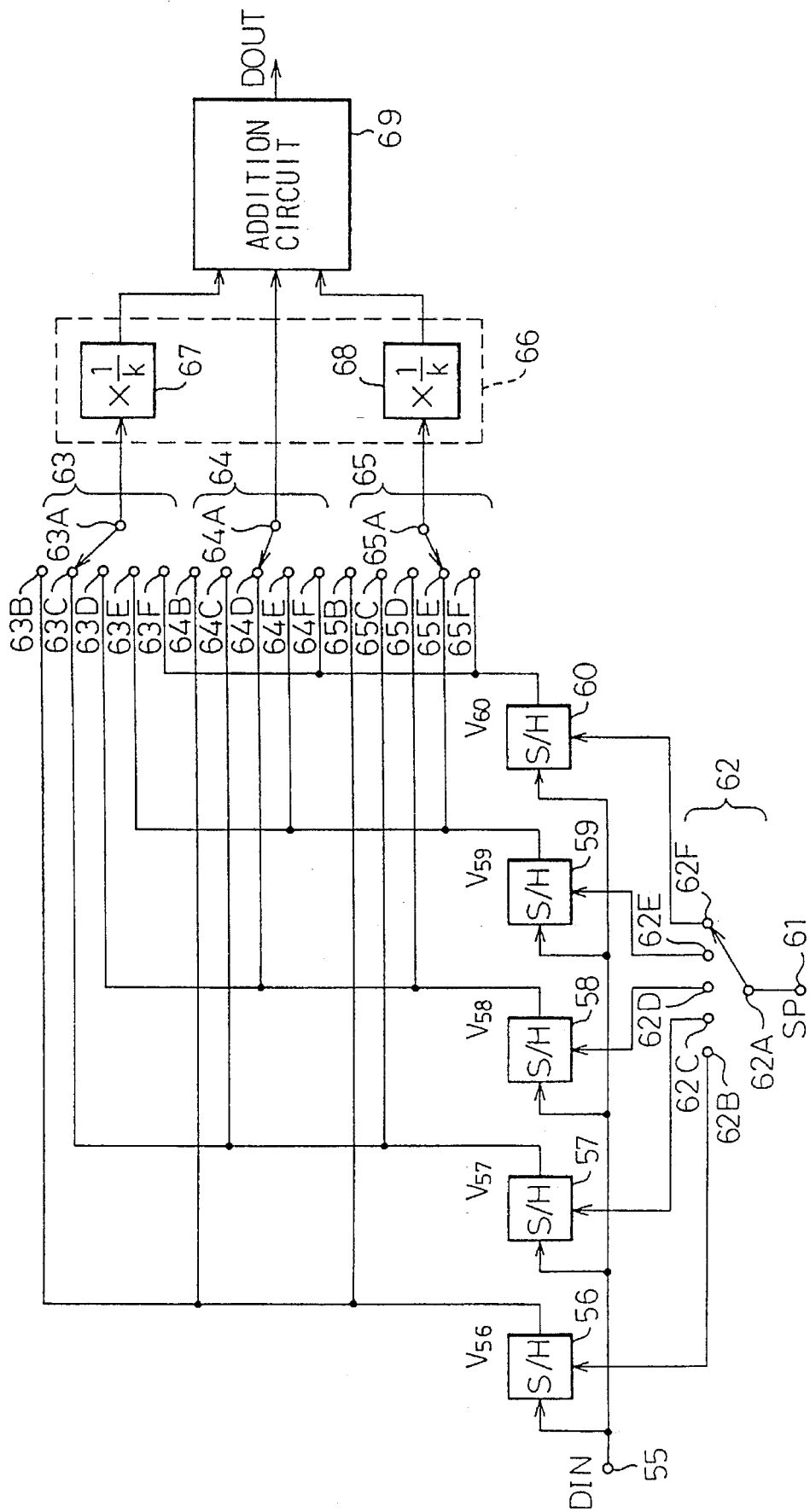
FIG. 10 is a diagram illustrating the circuit constitution of the waveform equalizer according to a second embodiment of the present invention.
Figure 12:
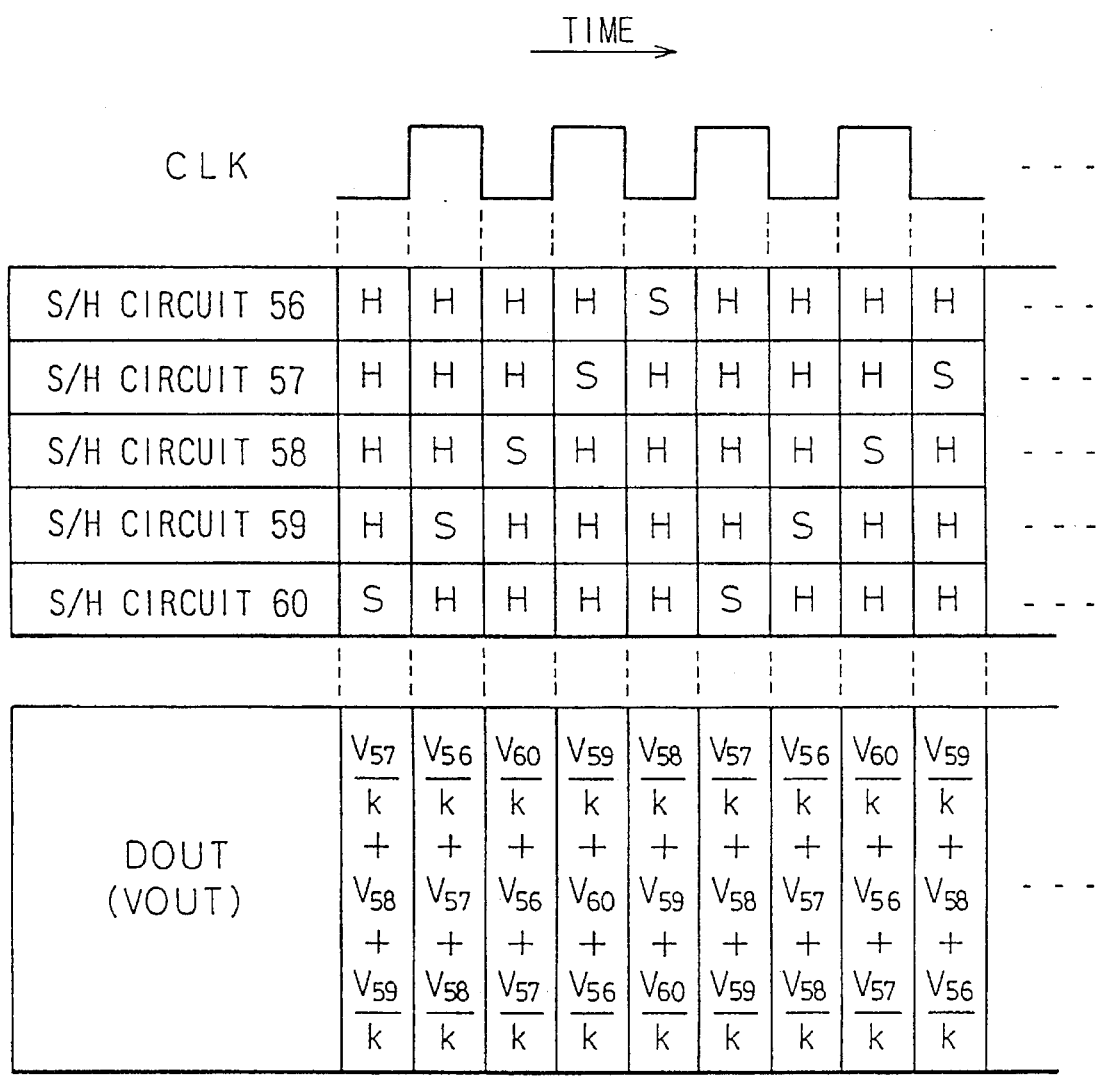
FIG. 12 is a timing chart showing the operation of the waveform equalizer shown in FIG. 10.

SECOND EMBODIMENT (see FIGS. 10 to 12)

FIG. 10 illustrates the circuit constitution of the waveform equalizer according to the second embodiment of the present invention.

In the illustration, reference 55 denotes a data signal input terminal for receiving a data signal DIN which is read from a hard disk and is the object of waveform equalization; references 56 to 60 each an S/H circuit; and reference 61 a sampling signal input terminal for receiving a sampling signal SP. Each of the S/H circuits 56 to 60 is constituted so as to carry out a sampling operation when the sampling signal SP is fed thereto, and so as to carry out a hold operation when the sampling signal SP is not fed thereto.

Also, reference 62 denotes a selector, which has a contact 62A connected to the sampling signal input terminal 61, and contacts 62B to 62F connected to the S/H circuits 56 to 60, respectively, and selects one of the contacts 62B to 62F to thereby feed the sampling signal SP via the selected contact to the corresponding S/H circuit. The selector 62 is constituted in the form of a multiplexer circuit.

In the present embodiment, the selector 62 carries out its select operation under control of control means such as a microcomputer (not shown) based on a predetermined control program. Concretely, the selector 62 is controlled to repeatedly connect the contact 62A to the contacts 62B to 62F, in synchronization with a clock signal CLK (see FIG. 11), according to the sequence of 62F→62E→62D→62C→62B, and thus to repeatedly feed the sampling signal SP to the S/H circuits 56 to 60 according to the sequence of 60→59→58→57→56. Namely, the S/H circuits 56 to 60 repeatedly carry out a sampling operation in synchronization with the clock signal CLK, according to the sequence of 60→59→58→57→56.

Also, references 63 to 65 denote selectors, respectively, each having a contact 63A, 64A, 65A connected to a weighting circuit (stated later), and contacts 63B to 63F, 64B to 64F, 65B to 65F connected to the S/H circuits 56 to 60, respectively. Each selector 63 (64, 65) selects one of the contacts 63B to 63F (64B to 64F, 65B to 65F) under control of control means (not shown) in the same manner as in the selector 62. Note, the selectors 63 to 65 are controlled to select outputs of S/H circuits in a hold operation state, other than an S/H circuit which has carried out a sampling operation just before, from among the S/H circuits 56 to 60. Each of the selectors 63 to 65 is constituted in the form of a multiplexer circuit.

In the present embodiment, the selector 63 is controlled to repeatedly connect the contact 63A to the contacts 63B to 63F, in synchronization with the clock signal CLK, according to the sequence of 63F→63E→63D →63C→63B, and thus to repeatedly select the S/H circuits 56 to 60 according to the sequence of 60→59→58→57→56. Also, the selector 64 is controlled to repeatedly connect the contact 64A to the contacts 64B to 64F, in synchronization with the clock signal CLK, according to the sequence of 64F→64E→64D→64C→64B, and thus to repeatedly select the S/H circuits 56 to 60 according to the sequence of 60→59→58→57→56. Also, the selector 65 is controlled to repeatedly connect the contact 65A to the contacts 65B to 65F, in synchronization with the clock signal CLK, according to the sequence of 65F→65E→65D→65C→65B, and thus to repeatedly select the S/H circuits 56 to 60 according to the sequence of 60→59→58→57→56.

FIG. 11 shows a timing chart defining the operations of each selector 62 to 65. In the chart, the mark "O" indicates the state in which each contact is selected, and the mark "X" indicates the state in which each contact is not selected.

Referring to FIG. 10 again, reference 66 denotes a weighting circuit; reference 67 a multiplication circuit for making an output of the selector 63 one k-th (1/k); and reference 68 a multiplication circuit for making an output of the selector 65 one k-th (1/k). Also, reference 69 denotes an addition circuit which effects an addition of an output of the multiplication circuit 67, an output of the selector 64, and an output of the multiplication circuit 68.

FIG. 12 shows a timing chart defining the operation of the waveform equalizer according to the present embodiment. More particularly, it shows the relationship between each state of the S/H circuits 56 to 60 and the output data signal DOUT (voltage value VOUT) with respect to the clock signal CLK, in the case where the selectors 62 to 65 operate as shown in FIG. 11.

In FIG. 12, reference "S" denotes a sampling operation state; reference "H" a hold operation state;

reference $V_{5\,6}$ a hold voltage of the S/H circuit 56;

reference $V_{5\,7}$ a hold voltage of the S/H circuit 57;

reference $V_{5\,8}$ a hold voltage of the S/H circuit 58;

reference $V_{5\,9}$ a hold voltage of the S/H circuit 59; and reference $V_{6\,0}$ a hold voltage of the S/H circuit 60.

Namely, according to the present embodiment, the input data signal DIN input to the data signal input terminal 55 is repeatedly sampled by the S/H circuits 56 to 60, in synchronization with the clock signal CLK, according to the sequence of 60→59→58→57→56.

Referring to FIG. 12, when the S/H circuit 60 is in a sampling operation state (S), the other S/H circuits 56, 57, 58 and 59 are in a hold operation state (H), respectively. In this case, as shown in FIG. 11, the selector 63 selects the output of the S/H circuit 57; the selector 64 selects the output of the S/H circuit 58; and the selector 65 selects the output of the S/H circuit 59. As a result, the voltage value VOUT of the output data signal DOUT is expressed as follows:

$$VOUT = V_{5\,7}/k + V_{5\,8} + V_{5\,9}/k$$

Also, when the S/H circuit 59 is in a sampling operation state, the other S/H circuits 60, 56, 57 and 58 are in a hold operation state, respectively. In this case, the selector 63 selects the output of the S/H circuit 56; the selector 64 selects the output of the S/H circuit 57; and the selector 65 selects the output of the S/H circuit 58. As a result, the voltage value VOUT of the output data signal DOUT is expressed as follows:

$$VOUT = V_{5\,6}/k + V_{5\,7} + V_{5\,8}/k$$

Also, when the S/H circuit 58 is in a sampling operation state, the other S/H circuits 59, 60, 56 and 57 are in a hold operation state, respectively. In this case, the selector 63 selects the output of the S/H circuit 60; the selector 64 selects the output of the S/H circuit 56; and the selector 65 selects the output of the S/H circuit 57. As a result, the voltage value VOUT of the output data signal DOUT is expressed as follows:

$$VOUT = V_{6\,0}/k + V_{5\,6} + V_{5\,7}/k$$

Also, when the S/H circuit 57 is in a sampling operation state, the other S/H circuits 58, 59, 60 and 56 are in a hold operation state, respectively. In this case, the selector 63 selects the output of the S/H circuit 59; the selector 64 selects the output of the S/H circuit 60; and the selector 65 selects the output of the S/H circuit 56. As a result, the voltage value VOUT of the output data signal DOUT is expressed as follows:

$$VOUT = V_{5\ 9}/k + V_{6\ 0} + V_{5\ 6}/k$$

Also, when the S/H circuit 56 is in a sampling operation state, the other S/H circuits 57, 58, 59 and 60 are in a hold operation state, respectively. In this case, the selector 63 selects the output of the S/H circuit 58; the selector 64 selects the output of the S/H circuit 59; and the selector 65 selects the output of the S/H circuit 60. As a result, the voltage value VOUT of the output data signal DOUT is expressed as follows:

$$VOUT = V_{5\ 8}/k + V_{5\ 9} + V_{6\ 0}/k$$

As explained above, according to the second embodiment of the present invention, the input data signal DIN is repeatedly sampled by the S/H circuits 56 to 60 according to the sequence of 60→59→58→57→56. Also, the outputs of S/H circuits in a hold operation state, other than an S/H circuit which has carried out a sampling operation just before, are weighted by the weighting circuit 66, and fed to the addition circuit 69.

Namely, the input data si9nal DIN is not shifted through a plurality of S/H circuits, and thus it is possible to effect an addition of each signal weighted with respect to the input data signal DIN which is not subject to accumulation of the sampling errors and the hold errors.

Moreover, it is possible to supply the addition circuit 69 with only the outputs of S/H circuits other than a S/H circuit which has carried out a sampling operation just before, i.e., with only the outputs of S/H circuits whose output voltages (hold voltages) are stable. This contributes to an improvement in the precision of equalization.

Therefore, according to the present embodiment, it is possible to obtain the output data signal DOUT with higher precision of equalization than that in the prior art waveform equalizer as shown in FIG. 1 or 3, and with higher precision of equalization than that in the first embodiment (see FIG. 6).

Also, during the period in which the outputs of three S/H circuits selected from among four S/H circuits in a hold operation state, respectively, are fed via the weighting circuit 66 to the addition circuit 69, the other one S/H circuit carries out a sampling operation of the input data signal DIN. Namely, the supply of sampled and held signals to the addition circuit 69 and the sampling of the input data signal DIN are simultaneously carried out. As a result, it is possible to realize a high speed of operation.

Furthermore, the total number of S/H circuits to be provided (in the present embodiment, "5") is the number of S/H circuits whose outputs are to be fed to the addition circuit (in the present embodiment, "3"), plus two; while the prior art waveform equalizer as shown in FIG. 1 or 3 needs twice the number of S/H circuits whose outputs are to be fed to the addition circuit. Accordingly, it is possible to reduce the scale of circuit, compared with the prior art.

Figure 13:
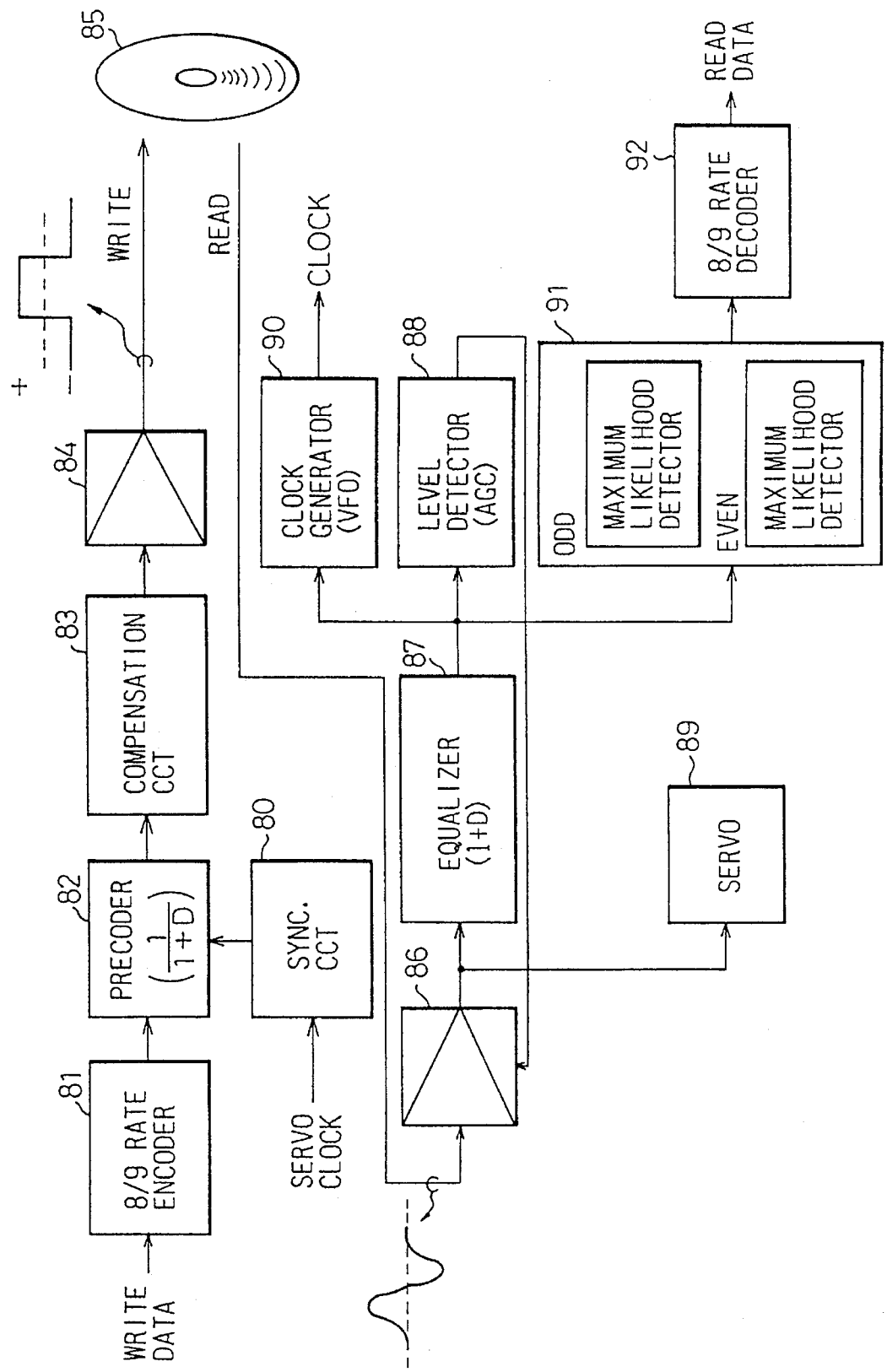
FIG. 13 is a block diagram illustrating an application of the waveform equalizer according to each embodiment of the present invention.

FIG. 13 illustrates an application of the waveform equalizer according to each embodiment of the present invention.

The illustrated example shows a constitution of a read/write signal processing circuit of a magnetic hard disk drive which carries out a recording and reproducing based on a PR4-ML, i.e., a combination of Partial Response class 4 and Maximum Likelihood. The waveform equalizer according to the present invention can be used in the read signal processing circuit (see equalizer 87).

In FIG. 13, reference 80 denotes a synchronization circuit responsive to a servo clock, for generating a synchronization signal used for the write processing; reference 81 an 8/9 rate encoder for encoding a write data by means of 8/9 code, where "8" indicates a data length and "9" indicates a code length; reference 82 a precoder responsive to the synchronization signal, for giving characteristics of 1/(1+D) to the encoded write data, where "D" indicates a delay operator; reference 83 a compensation circuit for compensating a data error in the write operation; reference 84 a write amplifier for amplifying the encoded write data; reference 85 a magnetic hard disk in which the amplified write data is written (or recorded); reference 86 a gain-controlled amplifier for amplifying a signal read from the magnetic hard disk 85; reference 87 a waveform equalizer responsive to the amplified read signal and having characteristics of (1+D); reference 88 a level detector for detecting an output level (equalized signal level) of the waveform equalizer 87 using an automatic gain controller (AGC); reference 89 a servo controller responsive to the amplified read signal; reference 90 a clock generator responsive to the equalized signal, for generating a clock signal using a variable frequency oscillator (VFO); reference 91 a maximum likelihood detecting circuit which includes a maximum likelihood detector for decoding data appearing in the order of odd numbers and a maximum likelihood detector for decoding data appearing in the order of even numbers; and reference 92 an 8/9 rate decoder for decoding data detected by the maximum likelihood detecting circuit 91, by means of 8/9 code, to thereby obtain a read data.

FIG. 14 illustrates another application of the waveform equalizer according to each embodiment of the present invention.

The illustrated example shows a constitution of a read/write signal processing circuit of an optomagnetic disk drive which carries out a recording and reproducing based on a PR1-ML, i.e., a combination of Partial Response class 1 and Maximum Likelihood. The waveform equalizer according to the present invention can be used in the read signal processing circuit (see equalizer 104).

In FIG. 14, reference 101 denotes a precoder for converting a source data of non-return to zero (NRZ) form into data of non-return to zero inverted (NRZI) form; reference 102 an optical head for use in a writing of the converted data; reference 103 an optomagnetic disk in which the converted data is written (or recorded); reference 104 a transversal filter using a waveform equalizer for equalizing a signal read from the optomagnetic disk 103; reference 105 an automatic gain controller (AGC) for detecting an output level (equalized signal level) of the transversal filter 104; reference 106 a low-pass filter (LPF) responsive to an output of the AGC 105; reference 107 an A/D converter for converting an output (analog signal) of the LPF 106 into a digital signal; reference 108 a phase-locked loop (PLL) circuit responsive to the analog output signal of the LPF 106; and reference 109 a Viterbi decoder responsive to an output of the PLL circuit 108, for decoding the digital output signal of the A/D converter 107 to thereby obtain a decoded output.

Although the present invention has been disclosed and described by way of two embodiments, it is apparent to those skilled in the art that other embodiments and modifications of the present invention are possible without departing from the essential features thereof.

What is claimed is:

1. A waveform equalizer, comprising:

a data signal input terminal which receives an input data signal which is the object of waveform equalization;

a plurality of sample and hold circuits connected individually and in parallel to the data signal input terminal;

a sampling control circuit which repeatedly brings the plurality of sample and hold circuits, one by one, to a sampling operation state;

a selection circuit which selects respective outputs of a predetermined number of sample and hold circuits which are in a hold operation state, from among the plurality of sample and hold circuits;

a weighting circuit which weights the outputs of the predetermined number of sample and hold circuits selected by the selection circuit and produces corresponding weighted outputs; and an addition circuit which adds the weighted outputs of the weighting circuit and thereby produces, and outputs, a waveform-equalized data signal.

2. The waveform equalizer according to claim 1, wherein the selection circuit selects outputs of all of sample and hold circuits which are in a hold operation state, respectively, from among the plurality of sample and hold circuits.

3. The waveform equalizer according to claim 2, wherein the selection circuit comprises selectors of a number, corresponding to the predetermined number of sample and hold circuits in a hold operation state, each of the selectors selectively feeding a corresponding one of the outputs of the predetermined number of sample and hold circuits to the weighting circuit.

4. The waveform equalizer according to claim 3, wherein the sampling control circuit further comprises a selector which repeatedly feeds a sampling signal to each of the plurality of sample and hold circuits according to a predetermined sequence.

5. The waveform equalizer according to claim 4, wherein each of the selector included in the sampling control circuit and the selectors included in the selection circuit carries out its select operation under control of control means based on a predetermined control program.

6. The waveform equalizer according to claim 4, wherein each of the selector included in the sampling control circuit and the selectors included in the selection circuit comprises a multiplexer circuit.

7. The waveform equalizer according to claim 1, wherein the selection circuit selects outputs of sample and hold circuits in a hold operation state, other than a sample and hold circuit which has just completed carrying out a sampling operation, from among the plurality of sample and hold circuits.

8. The waveform equalizer according to claim 7, wherein the selection circuit comprises selectors of a number, corresponding to the predetermined number of sample and hold circuits in a hold operation state, each of the selectors selectively feeding a corresponding one of the outputs of the predetermined number of sample and hold circuits to the weighting circuit.

9. The waveform equalizer according to claim 8, wherein the sampling control circuit comprises a selector which repeatedly feeds a sampling signal to each of the plurality of sample and hold circuits according to a predetermined sequence.

10. The waveform equalizer according to claim 9, wherein each of the selector included in the sampling control circuit and the selectors included in the selection circuit carries out its select operation under control of control means based on a predetermined control program.

11. The waveform equalizer according to claim 9, wherein each of the selector included in the sampling control circuit and the selectors included in the selection circuit comprises a multiplexer circuit.

* * * * *

UNITED STATES PATENT AND TRADEMARK OFFICE
CERTIFICATE OF CORRECTION

PATENT NO. : 5,579,340
DATED : Nov. 26, 1996
INVENTOR(S) : TOKURIKI et al.

It is certified that error appears in the above-indentified patent and that said Letters Patent is hereby corrected as shown below:

Col. 2,     line 13, change "diagram" to --diagrams--;
            line 17, change "diagram" to --diagrams--;
            line 30, change "diagram" to --diagrams--.

Col. 5,     line 29, delete "10".

Col. 7,     line 11, after "48C" delete blank space.

Col. 8,     line 5, in the equation, change "K + V" to --k + V--.

Col. 9,     line 57, after "63D" delete blank space.

Col. 11,    line 29, change "si9nal" to --signal--.

Signed and Sealed this

Twenty-fifth Day of March, 1997

Attest:

BRUCE LEHMAN

Attesting Officer      Commissioner of Patents and Trademarks